US012467596B2

(12) United States Patent
Schager et al.

(10) Patent No.: US 12,467,596 B2
(45) Date of Patent: Nov. 11, 2025

(54) ILLUMINATION DEVICE FOR A MOTOR VEHICLE HEADLIGHT AND MOTOR VEHICLE HEADLIGHT

(71) Applicant: ZKW Group GmbH, Wieselburg (AT)

(72) Inventors: Alexander Thomas Schager, Scheibbs (AT); Bernhard Stöger, Hörbranz (AT); Dominik Zusser, Ferschnitz (AT); Donghyun Go, Incheon (KR)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 18/921,790

(22) Filed: Oct. 21, 2024

(65) Prior Publication Data

US 2025/0137604 A1 May 1, 2025

(30) Foreign Application Priority Data

Oct. 25, 2023 (EP) .................................... 23205834

(51) Int. Cl.
*F21S 41/255* (2018.01)
*F21S 41/20* (2018.01)
(Continued)

(52) U.S. Cl.
CPC ............. *F21S 41/255* (2018.01); *F21S 41/24* (2018.01); *F21S 41/285* (2018.01); (Continued)

(58) Field of Classification Search
CPC ........ F21S 41/255; F21S 41/24; F21S 41/322; F21S 41/40; F21S 41/285
See application file for complete search history.

(56) References Cited

U.S. PATENT DOCUMENTS

| | | | | |
|---|---|---|---|---|
| 12,281,772 | B2 * | 4/2025 | Dreßler | F21S 41/322 |
| 2020/0003382 | A1 | 1/2020 | Godderidge et al. | |
| 2022/0412527 | A1 * | 12/2022 | Onoma | F21S 41/24 |

FOREIGN PATENT DOCUMENTS

| | | | |
|---|---|---|---|
| CN | 115183196 | A | 10/2022 |
| JP | 2014203587 | A | 10/2014 |

(Continued)

OTHER PUBLICATIONS

Extended European Search Report Issued for European Patent Application No. 23205834.7 dated Apr. 2, 2024 (5 Pages).

*Primary Examiner* — Matthew J. Peerce
(74) *Attorney, Agent, or Firm* — Eversheds Sutherland (US) LLP

(57) ABSTRACT

An illumination device for a motor vehicle headlight for producing light distribution with a cut-off line is provided. The illumination device has a light source, a light-permeable body, a light injection element for injecting light emitted by the light source into the light-permeable body, and a projection device, which has a focal surface and an optical axis. First and second optical exit structures are provided on a lower boundary surface of the body, which are configured such that light from the light source strikes an optical exit structure, exits the light-permeable body, propagates outside the light-permeable body to the projection device, and directly strikes the projection device and is thereby projected as sign light light beams into a region located above the cut-off line and forms a sign light light distribution. Two sign light light beams are projected in different partial regions of the region above the cut-off line.

19 Claims, 7 Drawing Sheets

(51) Int. Cl.

| | |
|---|---|
| ***F21S 41/24*** | (2018.01) |
| ***F21S 41/32*** | (2018.01) |
| ***F21S 41/40*** | (2018.01) |
| ***F21W 102/135*** | (2018.01) |

(52) U.S. Cl.
CPC ............. *F21S 41/322* (2018.01); *F21S 41/40* (2018.01); *F21W 2102/135* (2018.01)

(56) References Cited

FOREIGN PATENT DOCUMENTS

| | | | |
|---|---|---|---|
| JP | 2017084556 | A | 5/2017 |
| WO | 2023038010 | A1 | 3/2023 |

* cited by examiner

ILLUMINATION DEVICE FOR A MOTOR VEHICLE HEADLIGHT AND MOTOR VEHICLE HEADLIGHT

CROSS-REFERENCE TO RELATED APPLICATIONS

This application claims priority to European Patent Application No. 23205834.7, filed Oct. 25, 2023, which is incorporated herein by reference.

FIELD OF THE INVENTION

The invention relates to an illumination device for a motor vehicle headlight for producing light distribution with a cut-off line, wherein the illumination device comprises at least one light source, a light-permeable body, at least one light injection element for injecting light emitted by the at least one light source into the light-permeable body and a projection device, wherein the projection device has a focal surface as well as an optical axis, wherein light from the at least one light source enters the light-permeable body via the light injection element and propagates in the light-permeable body as a first light beam to a light exit surface of the light-permeable body, and wherein the light-permeable body is delimited by an upper boundary surface and a lower boundary surface opposite the upper boundary surface, wherein at least some of the light rays of the first light beam striking the upper and/or lower boundary surface are totally reflected one or more times at the respective boundary surface, and wherein the light-permeable body is delimited by a light exit surface, and wherein the light rays that are totally reflected one or more times at the at least one boundary surface and exit the body via the light exit surface, as well as those light rays injected by the light source which propagate without reflection through the light-permeable body to the light exit surface and exit the body via this are modified by the light-guiding body into a second light beam, which is projected by the projection device as the light distribution to be produced. The light exit surface is, for example, located opposite the light injection element. Furthermore, the invention relates to a motor vehicle headlight having at least one such illumination device.

BACKGROUND

Illumination devices described above are known from the prior art, in which a sign light light distribution can also be produced by modifying the light-permeable body, the light injection element or the projection device in addition to a front area light or a dipped beam distribution with the at least one light source.

In the known solutions, the sign light light distribution produced is relatively uniform. However, in order to achieve luminous intensity values that are specified by law, for example, at defined points in the light distribution, it is often necessary for the luminous intensity of the entire sign light light distribution to be comparatively high. However, this means that the luminous intensity values are higher than desired or even higher than legally permitted at other points.

SUMMARY OF THE INVENTION

It is an object of the invention to provide an illumination device with which sign light light distribution can be produced in addition to front area light or dipped beam distribution and the aforementioned disadvantages are eliminated.

Another object of the invention can be to produce a sign light light distribution, which takes into consideration in particular the characteristics of U.S. regulation, for example FMVSS Standard 108.

This object is achieved with an illumination device described in the introduction by virtue of the fact that, according to the invention, at least one first optical exit structure and at least one second optical exit structure are provided on or in the lower boundary surface, and wherein the optical exit structures are designed in such a way that light from the first light beam which strikes an optical exit structure exits the light-permeable body, wherein the light exiting the at least one first optical exit structure propagates in the form of a third light beam outside the light-permeable body to the projection device, and wherein the light exiting the at least one second optical exit structure propagates in the form of a fourth light beam outside the light-permeable body to the projection device, wherein the at least one second optical exit structure is further away from the focal surface than the at least one first optical exit structure, and wherein the third and fourth light beams strike the projection device directly, i.e. without prior re-entry into the light-permeable body, and are projected by this as sign light light beams into a region located above the cut-off line and together, for example, form a sign light light distribution, wherein the two sign light light beams are projected in different partial regions of the region located above the cut-off line.

Exactly one first and exactly one second exit structure are preferably provided.

It may be provided that the at least one first and the at least one second optical exit structure respectively extend over a defined transverse extension transverse to the optical axis of the projection device, and wherein the at least one first and the at least one second optical exit structure respectively extend over a defined longitudinal extension approximately in the direction of the optical axis of the projection device.

Thanks to the embodiment according to the invention, two different sign light light beams are produced, which illuminate different regions in the light distribution and together form the sign light light distribution. The light quantity of the individual sign light light beams and thus the luminous intensity in the light distribution can be influenced by designing the different exit structures accordingly, for example with regard to the size or extension of the respective exit structure. As a result of the different distances of the exit structures to the focal surface or Petzval surface of the projection device, the light rays emerging from the further away exit structure are fuzzier, i.e. “blurred”, in the light image and produce a more uniform illumination in the light image, whereas the light rays from the exit structure located closer to the Petzval surface or focal surface are sharper or more focused and thus illuminate a smaller region or smaller regions more brightly.

Advantageous embodiments of the invention are described in the dependent claims.

It is preferably provided that the third and fourth light beams strike the projection device and pass through it in different regions of the projection device, in particular below an optical axis of the projection device, wherein these regions of the projection device project the third and fourth light beams as sign light light beams into the region located above the cut-off line and, for example, form a sign light light distribution, wherein the two sign light light beams are projected in different partial regions of the region located above the cut-off line.

The optical axis of the projection device also constitutes the optical axis of the illumination device at the same time.

It is advantageous if the at least one first optical exit structure and the at least one second optical exit structure are designed and arranged in such a way that the third and fourth light beams strike the projection device or a region of the projection device in such a way that the partial regions in which the emerging sign light light beams are projected by the projection device either partially overlap, or are adjacent to each other in at least one section, or are spaced apart from each other.

It may be provided that the at least one first optical exit structure is designed as an elevation on or a depression in the light-permeable body, and wherein the at least one second optical exit structure is designed as an elevation on or a depression in the light-permeable body.

Furthermore, it may be provided that the at least one first and the at least one second optical exit structure have a different sized transverse extension, wherein the at least one first exit structure which is nearer the light exit surface preferably has a smaller transverse extension than the at least one second exit structure.

In this way, the light quantity emerging from the exit structures can be controlled.

It may be provided that at least one of the optical exit structures runs symmetrically in relation to the optical axis of the projection device with regard to its transverse extension, wherein a first or second optical exit structure preferably runs symmetrically and the other, second or first optical exit structure asymmetrically in relation to the optical axis of the projection device.

A symmetrically arranged exit structure provides a symmetrical illuminance distribution in the light image with respect to the vertical axis (V-V axis), whilst an asymmetrically arranged exit structure produces an asymmetrical illuminance distribution with respect to the vertical axis. For example, in the USA, the FMVSS 108 standard stipulates certain illuminance levels along the lines 5-5 and 8-8 described in this standard, wherein the position of these lines is asymmetrical in relation to the V-V line. With a corresponding asymmetrical arrangement of an exit structure, the required illuminance levels can also be achieved with regard to such asymmetrically positioned lines or regions. The basic sign light light distribution is symmetrical with respect to its illuminance distribution and is achieved with a symmetrical exit structure.

It is preferably provided that the transverse direction in which the at least one first and/or the at least one second optical exit structure extend(s), runs substantially normal to the first light propagation direction and/or normal to the optical axis of the projection device and preferably substantially horizontally.

It may further be provided that the at least one first and/or the at least one second exit structure is or are designed in the form of an exit prism or has/have exit prisms.

It may be provided that each exit prism has an exit surface, which is designed and inclined in such a way that the emerging light beams are directed into the region or regions of the projection device which project the third and fourth light beams as sign light light beams into the region located above the cut-off line.

By way of example, it is provided that at least one exit surface or both exit surfaces is or are curved, in particular concavely curved, horizontally, i.e. in horizontal sections, wherein horizontal intersection curves, resulting by intersecting such a curved exit surface with horizontal planes, preferably have the shape of a partial circle or follow the shape of the Petzval surface of the projection device.

It may be provided that the at least one or preferably both exit surfaces are not curved vertically, i.e. in vertical sections.

It is preferably provided that an exit surface or the exit surfaces are inclined in such a way that the light beams passing or emerging through the exit surface or through the exit surfaces run orthogonal to the exit surface or the exit surfaces.

This can reduce losses and colour errors.

By designing the light injection element accordingly, a parallel beam fan can be formed in such a way that the light rays impinge on the exit surfaces at an angle of 90°, as seen over the transverse extent of the exit surfaces.

Furthermore, it is preferably provided that the light-permeable body has a screen edge, which is arranged in the light propagation direction between the light injection element and the projection device, wherein the screen edge in the light distribution is depicted as the cut-off line.

The screen edge is responsible for modifying the first light beam into the second light beam exiting the light-permeable body in such a way that the light distribution produced by the projection device has a cut-off line. The shape of the cut-off line in the light distribution is determined by the shape of the screen edge. The course of the screen edge defines the boundary rays which just barely contribute to the light distribution.

The screen edge is formed by the light exit surface and the lower boundary surface, i.e. the two surfaces converge in the screen edge.

Furthermore, it may be provided that the light injection element forms the light, which is emitted by the light source and enters the light injection element, into the first light beam, wherein the light beam is preferably directed into a region, in particular into a region above, preferably just above the screen edge.

This region lies or extends in particular just above the screen edge.

It is preferably provided that the screen edge is curved, in particular concavely curved, in the horizontal direction, and preferably follows the focal point line of the projection device in the screen edge, wherein the screen edge preferably lies in or approximately in the Petzval surface of the projection device.

In terms of the wording that the screen edge lies in the Petzval surface, it should be noted that, to be precise, the relationships are as follows: the projection device has a focal point which lies on the optical axis of the projection device. The Petzval surface or focal point surface contains this focal point, just as a focal line runs through this focal point and lies in the Petzval surface.

The screen edge is not usually located precisely in the Petzval surface or in the focal point, but rather at a (small) distance above it. Typically, the cut-off line in the light image is lowered slightly below the horizontal 0°-0° line or below the horizon, usually by 0.573°. In order to achieve this in the light image, the screen edge is located in the vertical direction slightly, in practice usually a few tenths of a millimetre, above the optical axis of the projection device or above the focal point.

Furthermore, it can be provided that the light exit surface is concave in the horizontal direction and preferably follows the shape of the Petzval surface of the projection device.

It may also be provided that the light exit surface is convex in the vertical direction. In this embodiment, the light exit surface is inclined away from the Petzval surface starting from the screen edge. The light distribution produced is slightly blurred, i.e. the light distribution produced is more uniform and the height of the projection device can be reduced.

By way of example, it is provided that the at least one light source and/or the sign light light source respectively comprise(s) one or more light-emitting elements, for example one or more LEDs.

BRIEF DESCRIPTION OF THE DRAWINGS

The invention is explained in more detail below based on the drawings.

DETAILED DESCRIPTION

Figure 1:
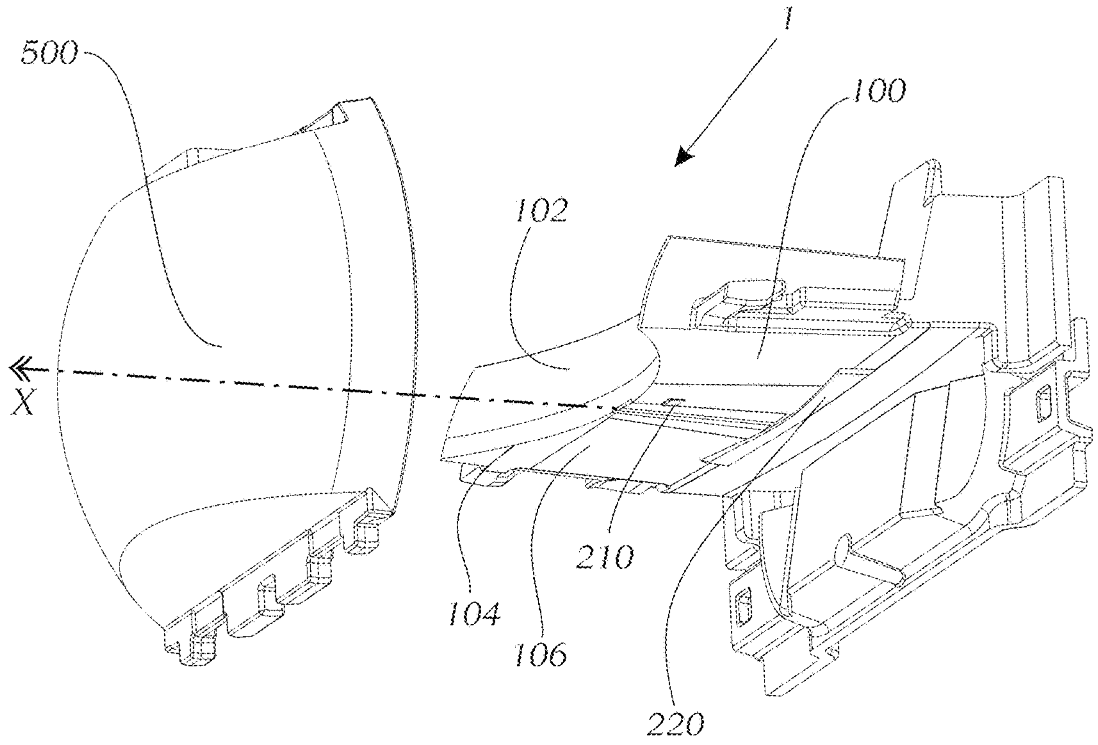
FIG. 1 shows the essential components of an embodiment according to the invention of an illumination device for a motor vehicle headlight in a perspective view from diagonally below.
Figure 1A:
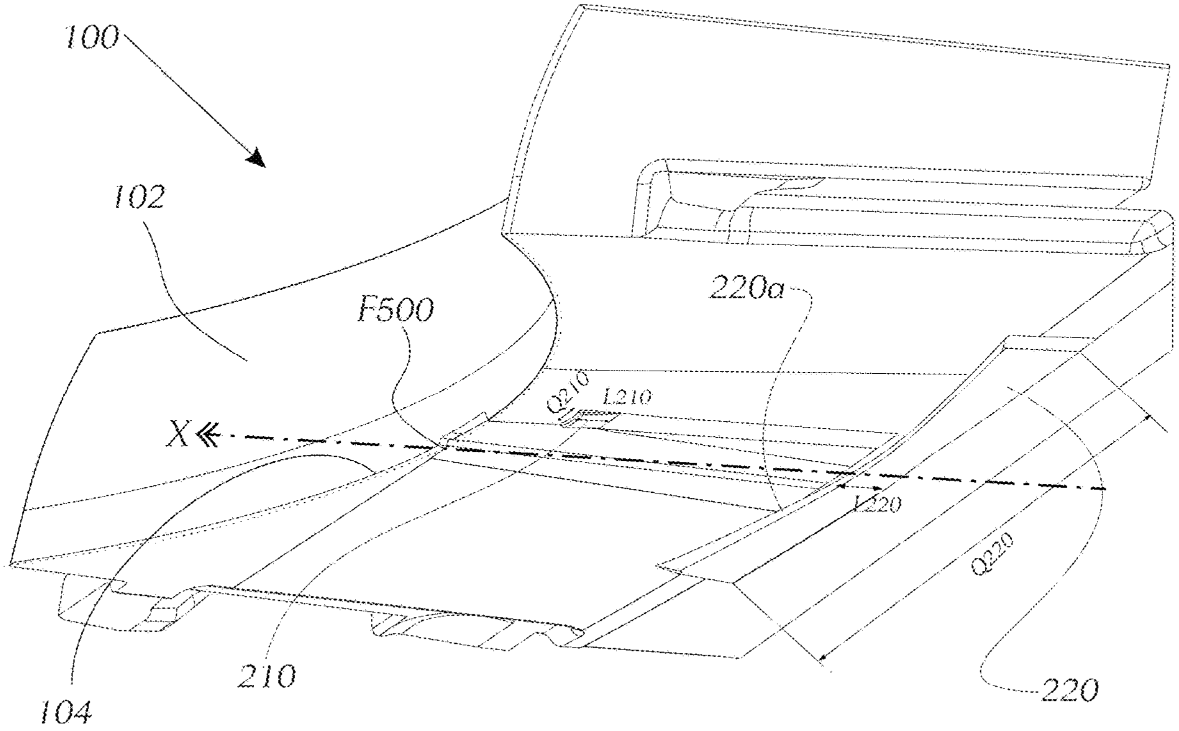
FIG. 1*a* shows a light-permeable body of the illumination device shown in FIG. 1 for beam shaping in a perspective view from diagonally below on exit structures according to the invention.
Figure 2:
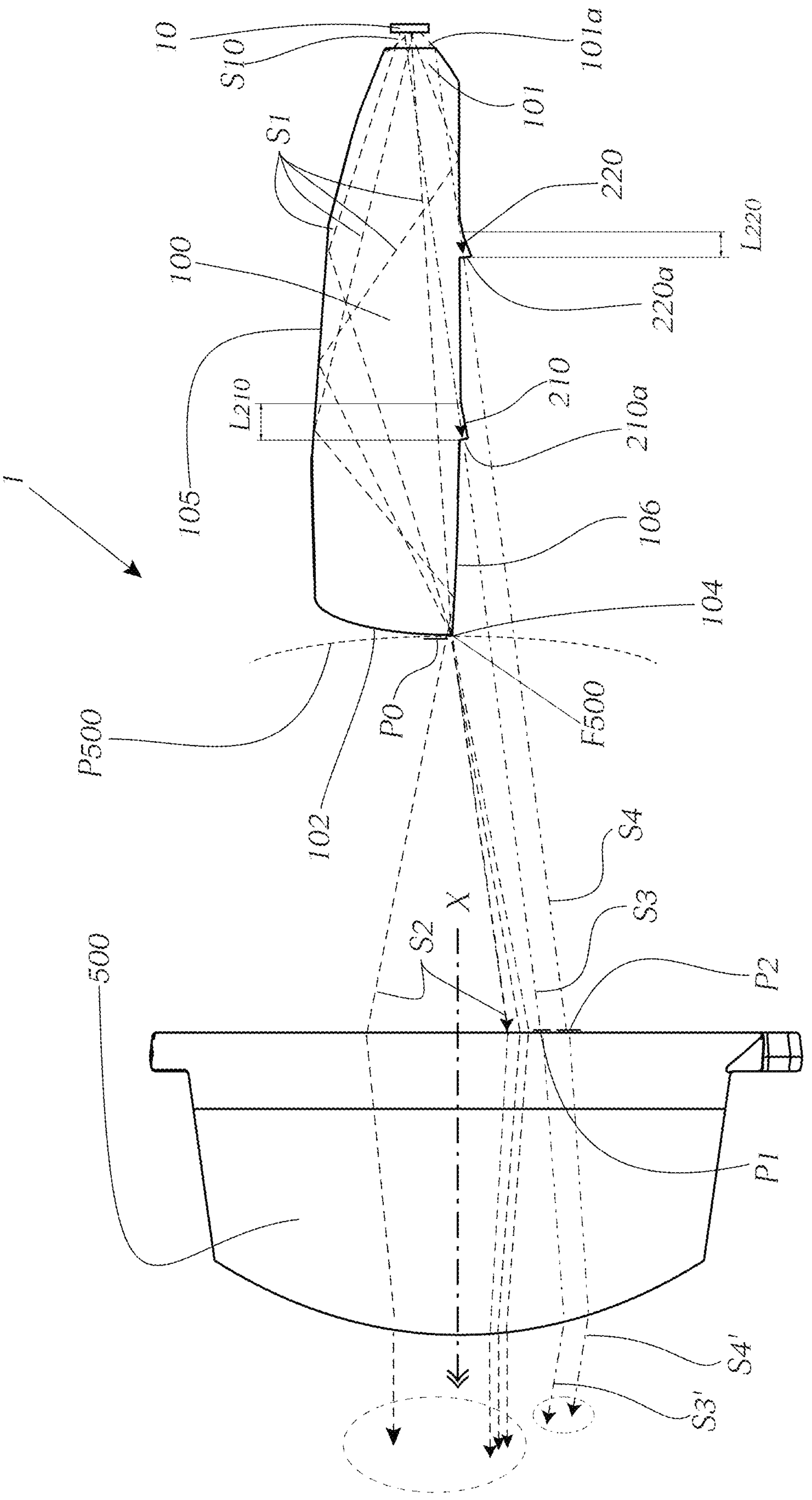
FIG. 2 shows a vertical section through the illumination device shown in FIG. 1 along a vertical plane, which runs through the optical axis of the projection device.
Figure 7:
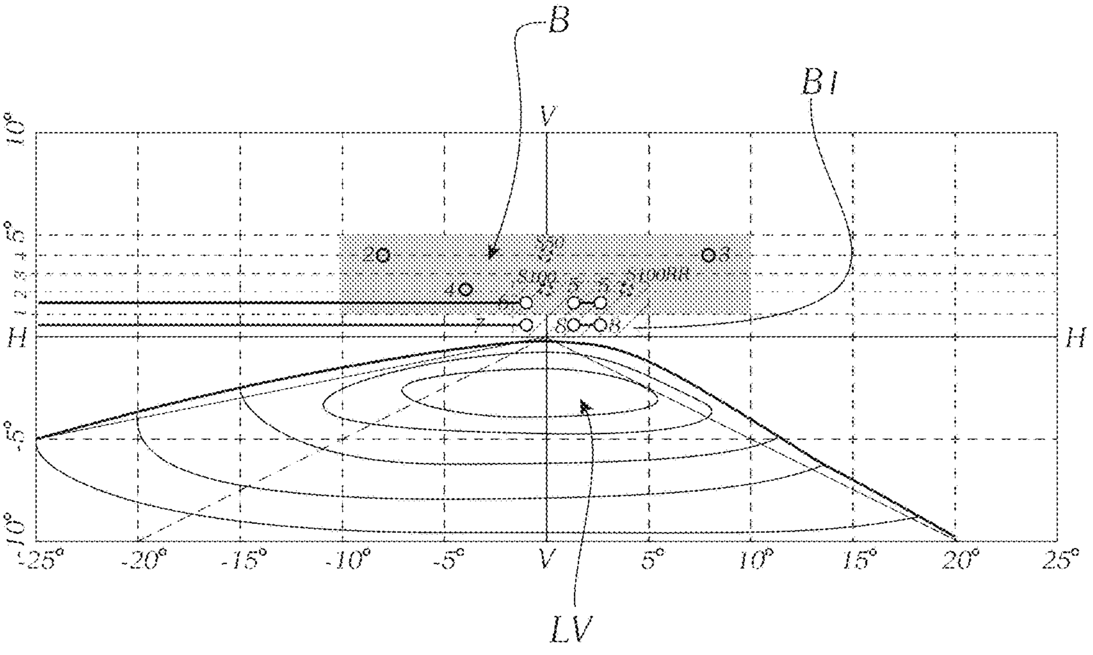
FIG. 7 shows an exemplary, schematic illustration of light distribution in the form of dipped beam distribution and sign light light distribution.
Figure 8:
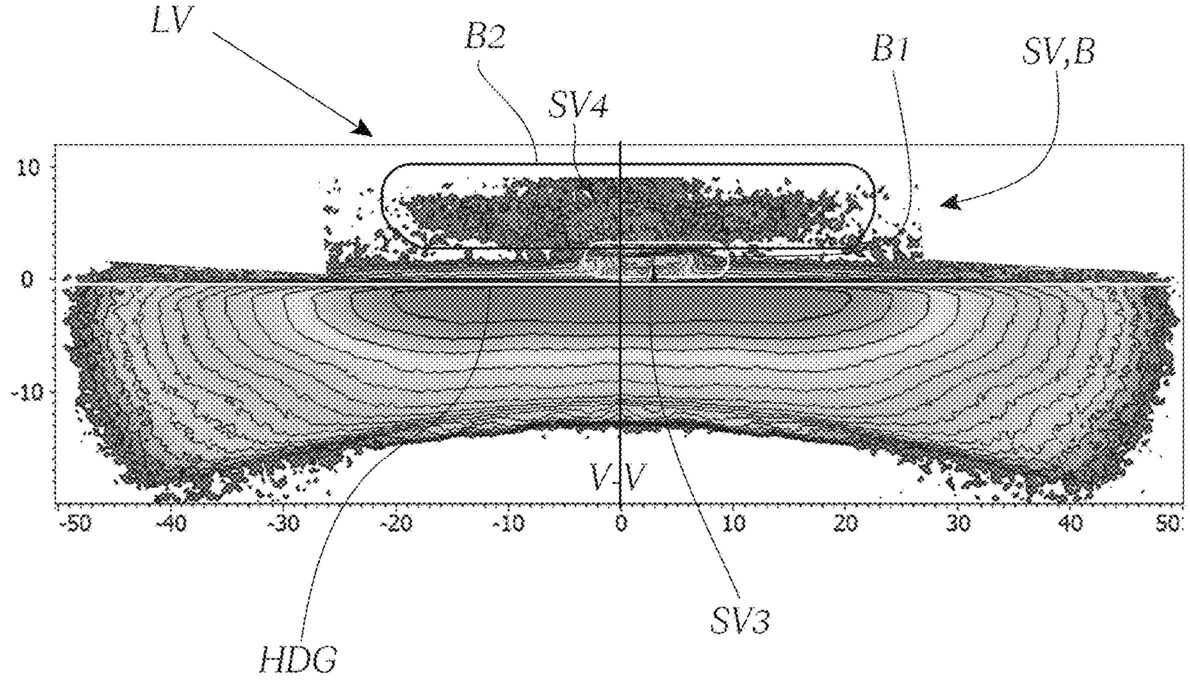
FIG. 8 shows an exemplary illustration of light distribution as a result of a lighting simulation.

FIGS. 1, 1*a* and 2 show an illumination device 1 for a motor vehicle headlight for producing light distribution LV with a cut-off line HDG, wherein the light distributions that can be produced with this illumination device 1 are schematically shown in FIGS. 7 and 8, wherein FIG. 8 shows a light distribution as a simulation result using an illumination device according to the invention.

Figure 2A:
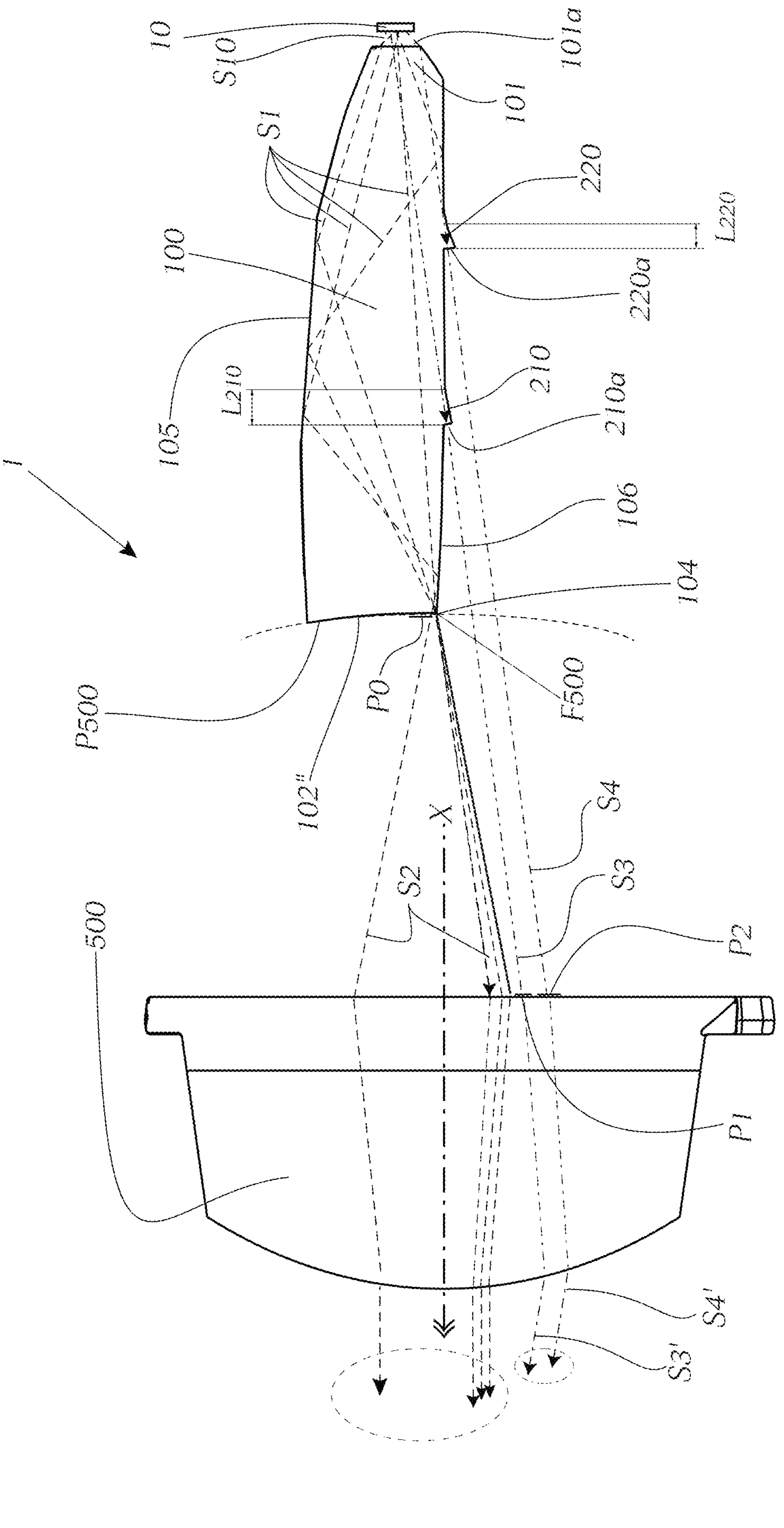
FIG. 2*a* shows a vertical section through an alternative illumination device.
Figure 3:
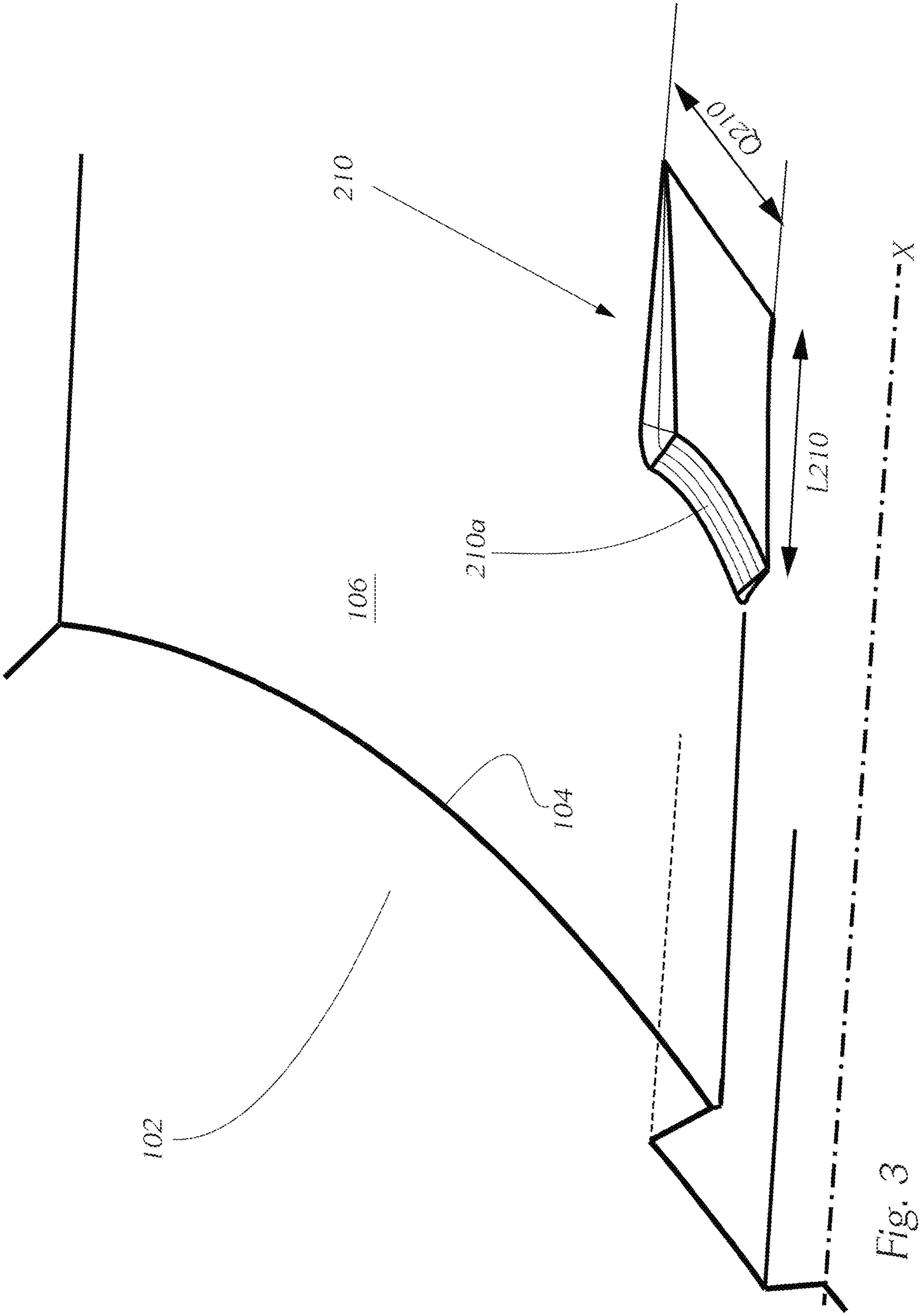
FIG. 3 shows a detail view of the first exit structure in a perspective view from below.

FIG. 2*a* shows an alternative embodiment of an illumination device 1 according to the invention. The same reference numerals as in FIGS. 1, 1*a* and 2 denote the same elements.

FIGS. 3 to 6 show details of the illumination device 1, wherein these apply to both embodiments.

An illumination device 1 according to FIGS. 1, 1*a* and 2 or according to FIG. 2*a* comprises a light source 10, a light-permeable body 100, a light injection element 101 for injecting light into the light-permeable body 100, which the light source 10 emits, as well as a projection device 500, wherein the projection device 500 has a focal surface or Petzval surface P500. The projection device 500 is typically in the form of a projection lens, but can also have a more complex design in the form of a lens system. The Petzval surface P500 also includes the focal line of the projection device 500, on which—in a horizontal plane—the focal points of the projection device 500 lie.

By way of example, the light-permeable body 100 and the light injection element 101 are integral and preferably formed from the same material. The projection device 500 is preferably designed separated from these elements 100, 101. The body 100, light injection element 101 and projection device 500 can be formed from the same material.

The transparent, light-permeable material which the bodies 100, 101, 500 can be made of has a refractive index greater than that of air. The material contains, for example, PMMA (polymethyl methacrylate) or PC (polycarbonate) and is in particular preferably made thereof. However, the bodies can also be made of glass material, in particular inorganic glass material.

Light S10 (FIGS. 2, 2*a*), which the light source 10 emits, is injected by the light injection element 101 into the light-permeable body 100 via a light entry surface 101*a* of the light-permeable body 100. The injection element 101 can, for example, have the form of an imaging or non-imaging collimator optical system. The light entry surface 101*a* is respectively designed accordingly. The planar light entry surface 101*a* shown or indicated in the figures is merely one of several options, known per se, for designing the light entry surface 101*a*.

The light source or generally the at least one light source is, for example, respectively one or more light-emitting elements, for example one or more LEDs, which are encompassed by the light source or the at least one light source.

The light-permeable body 100 is, inter alia, delimited by an upper boundary surface 105 and a lower boundary surface 106 opposite the upper boundary surface 105 as well as by a light exit surface 102, 102" opposite the light entry surface 101*a*.

The injected light from the light source 10 propagates in the light-permeable body 100 substantially in the direction of the light exit surface 102 as a first light beam S1, wherein the light injection element 101 forms the light emitted by the light source 10 and injected into the light injection element 101 into a first light beam S1.

The injected light moves partly without deflection and partly as a result of total reflection at boundary surfaces, in particular at the upper boundary surface 105 and/or lower boundary surface 106 in the light-permeable body 100 as a light beam S1 in the direction of the light exit surface 102.

The light-permeable body 100 has a screen edge 104, which is arranged in the light propagation direction between the light injection element 101 and the projection device 500, wherein the screen edge 104 in the light distribution LV is depicted as the cut-off line HDG (see FIG. 7 and FIG. 8).

The screen edge 104 is responsible for modifying the first light beam S1 into the second light beam S2 exiting the light-permeable body 100 in such a way that the light distribution LV produced by the projection device 500 from the light rays of the light beam S2 has a cut-off line HDG. The shape of the cut-off line in the light distribution LV is determined by the shape and contour of the screen edge 104.

The screen edge 104 is formed by the light exit surface 102 and the lower boundary surface 106, i.e. the two surfaces 102, 106 converge in the screen edge 104.

The light injection element 101 and the light-permeable body 100 are shaped in such a way that the first light beam S1 is directed in the direction of the light exit surface 102, but preferably mainly into a region P0, in particular a region preferably just above the screen edge 104, resulting in a sharp cut-off line HDG with a high illuminance below the cut-off line in the light distribution LV.

It is preferably provided that, as shown, the screen edge 104 is curved, in particular concavely curved, in the horizontal direction, and preferably follows the focal point line F500 of the projection device 500 in the screen edge 104.

It is preferably provided that the screen edge 104 lies in or approximately in the Petzval surface P500 of the projection device 500, as has already been explained in the introduction.

Furthermore, as is the case in the illumination device 1 according to FIGS. 1, 1*a* and 2, the light exit surface 102 can be convex in the vertical direction. In this embodiment shown, the light exit surface 102 is thus inclined away from the Petzval surface P500, towards the light source 10, starting from the screen edge 104. The light distribution LV produced is slightly blurred, i.e. the light distribution produced is more uniform and the height of the projection device 500 can be reduced.

Alternatively, it may be provided—see FIG. 2*a*—that the light exit surface 102" is concave in the horizontal direction and preferably follows the shape of the Petzval surface P500 of the projection device 500.

Specifically, the light rays propagating to the light exit surface 102, 102" and exiting the body 100 via this are modified by the light-guiding body 100, in particular also by the screen edge 104, into a second light beam S2, which is projected by the projection device 500 as light distribution LV with the cut-off line HDG.

As further shown in FIGS. 1, 1*a*, 2 and 2*a*, a first optical exit structure 210 and a second optical exit structure 220 are provided on or in the lower boundary surface 106. Each optical exit structure 210, 220 respectively extends over a defined transverse extension Q210, Q220 transverse to the optical axis X of the projection device 500 or the illumination device 1. Each optical exit structure 210, 220 respectively extends over a defined longitudinal extension L210, L220 approximately in the direction of the optical axis X.

Purely for clarification, it should be noted at this point that in theory, two or more first and also two or more second exit structures can also be provided, which are then preferably respectively arranged side by side (first structures next to one another, second structures next to one another).

The optical exit structures 210, 220 are designed in such a way that light from the first light beam S1, which strikes an optical exit structure 210, 220, exits the light-permeable body 100.

The light emerging from the first optical exit structures 210 propagates in the form of a third light beam S3 outside the light-permeable body 100 to the projection device 500.

The light emerging from the second optical exit structure 220 propagates in the form of a fourth light beam S4 outside the light-permeable body 100 to the projection device 500.

The second optical exit structure 220 is further away from the focal surface P500 than the first optical exit structures 210.

The arrangement is such that the third and fourth light beams S3, S4 strike the projection device 500 directly, i.e. without prior re-entry into the light-permeable body 100, and are projected by this as sign light light beams S3', S4' into a region B located above the cut-off line HDG and together, for example, form a sign light light distribution SV, wherein the two sign light light beams S3', S4' are projected in different partial regions B1, B2 of the region B located above the cut-off line HDG.

Light S4, which comes from the exit structure 220 further away from the focal surface P500, produces a blurry or less sharp image due to the (highly) defocussed position and thus better uniformity with approximately the same illuminance in the light distribution SV4 produced compared to the light distribution SV3 produced by the light rays S3 of the first exit structures 210 arranged nearer the focal surface P500.

The light distribution SV4, which is produced by the exit structure 220 that is further away from the focal surface P500, forms a type of "basic" sign light distribution that fulfils the requirements for a sign light light distribution according to ECE, for example. The other light distribution SV3 forms a type of "additional" sign light light distribution, with which other requirements for the sign light that go beyond ECE can be fulfilled and/or it enables the "basic" sign light light distribution SV4 to be modified in such a way that, for example in terms of the illuminance produced, certain required limit values are reached, but together with the additional sign light light distribution SV3 a sign light light distribution SV can still be generated that complies with the law or regulations in particular.

It is preferably provided that the third and fourth light beams S3, S4 strike the projection device 500 and pass through it in different regions P1, P2 of the projection device, 500, in particular below an optical axis X of the projection device 500, wherein these regions of the projection device 500 project the third and fourth light beams S3, S4 as sign light light beams S3', S4' into the region B located above the cut-off line HDG and, for example, form the sign light light distribution SV, wherein the two sign light light beams S3', S4' are projected, as described, in different partial regions B1, B2 of the region B located above the cut-off line HDG.

The first optical exit structure(s) 210 and the second optical exit structure 220 are preferably designed and arranged in such a way that the third and fourth light beams S3, S4 strike the projection device 500 or a region P1, P2 of the projection device 500 in such a way that the partial regions B1, B2 in which the emerging sign light light beams S3', S4' are projected by the projection device 500 either partially overlap, or are adjacent to each other in at least one section, or are spaced apart from each other.

FIG. 8 shows exemplary simulation results. In relation to the vertical 0° axis, the partial region B1 is offset to the right just above the cut-off line and is comparatively concentrated, while the partial region B2 above it runs symmetrically to the vertical 0° axis and is significantly less concentrated than the partial region B1, i.e. it extends over a significantly larger angular range in both the horizontal and vertical directions. The upper edge of the partial region B1 merges with the lower edge of the partial region B2. The total sign light distribution SV results from the partial sign light light distributions SV3, SV4, which are projected into the partial region B1 or B2 and can be described by $SV=SV(S3')\cup SV(S4')$.

In the embodiment shown (which is identical for FIG. 2 and FIG. 2*a*), the first optical exit structures 210 are designed as an elevation on the light-permeable body 100, specifically on the lower side 106, and the second optical exit structure 220 is also designed as an elevation on the light-permeable body 100, again on the lower side 106.

The sign light light distributions SV3, SV4 shown in FIG. 7 and FIG. 8 (with considerably different horizontal extensions) are achieved by virtue of the fact that the first and the second optical exit structure 210, 220, as shown in FIG. 1*a*, have a different sized transverse extension Q210, Q220, wherein the first exit structure 210 which is nearer the light exit surface 102 has a smaller transverse extension Q210 than the second exit structure Q220. In this way, the light quantity emerging from the exit structures can be controlled. In addition, the second exit structure 220 is arranged symmetrically in relation to the optical axis X, whilst the first exit structure 210 is shifted left in relation to the optical axis X and is preferably located completely left of the optical axis X.

In the exemplary embodiment shown, the second exit structure 220 extends continuously from left to right over substantially an entire width of the light-permeable or light-guiding body 100, the extension on both sides of the optical axis X is identical.

Regardless of the specific number of first and second exit structures 210, 220 and the arrangement in relation to the optical axis X, it is preferably provided that the (partial) sign light light distribution SV4 of the light beams S4 is symmetrical in relation to a vertical 0°-0° line (V-V line) in the light image, whilst the (partial) sign light light distribution SV3 of the light beams S3 is preferably asymmetrical in relation to the vertical 0°-0° line (V-V line, vertical central line where H=0°) in the light image and is shifted right for headlights for driving on the right, and would be shifted left for headlights for driving on the left.

Returning once again to FIGS. 1*a* and 3-6, it can be seen that it is preferably provided that the transverse direction in which the first and second optical exit structures 210, 220 extend, run substantially normal to the optical axis X of the projection device 500 and substantially horizontally.

If the exit structures 210, 220 are considered in detail, these are preferably designed, as shown, approximately in the form of an exit prism. The exit prisms respectively have an exit surface 210*a*, 220*a*, which is inclined in such a way that the emerging light beams S3, S4 are directed into the region or regions P1, P2 of the projection device 500 which project the third and fourth light beams S3, S4 as sign light light beams S3', S4' into the region B located above the cut-off line HDG.

Figure 4:
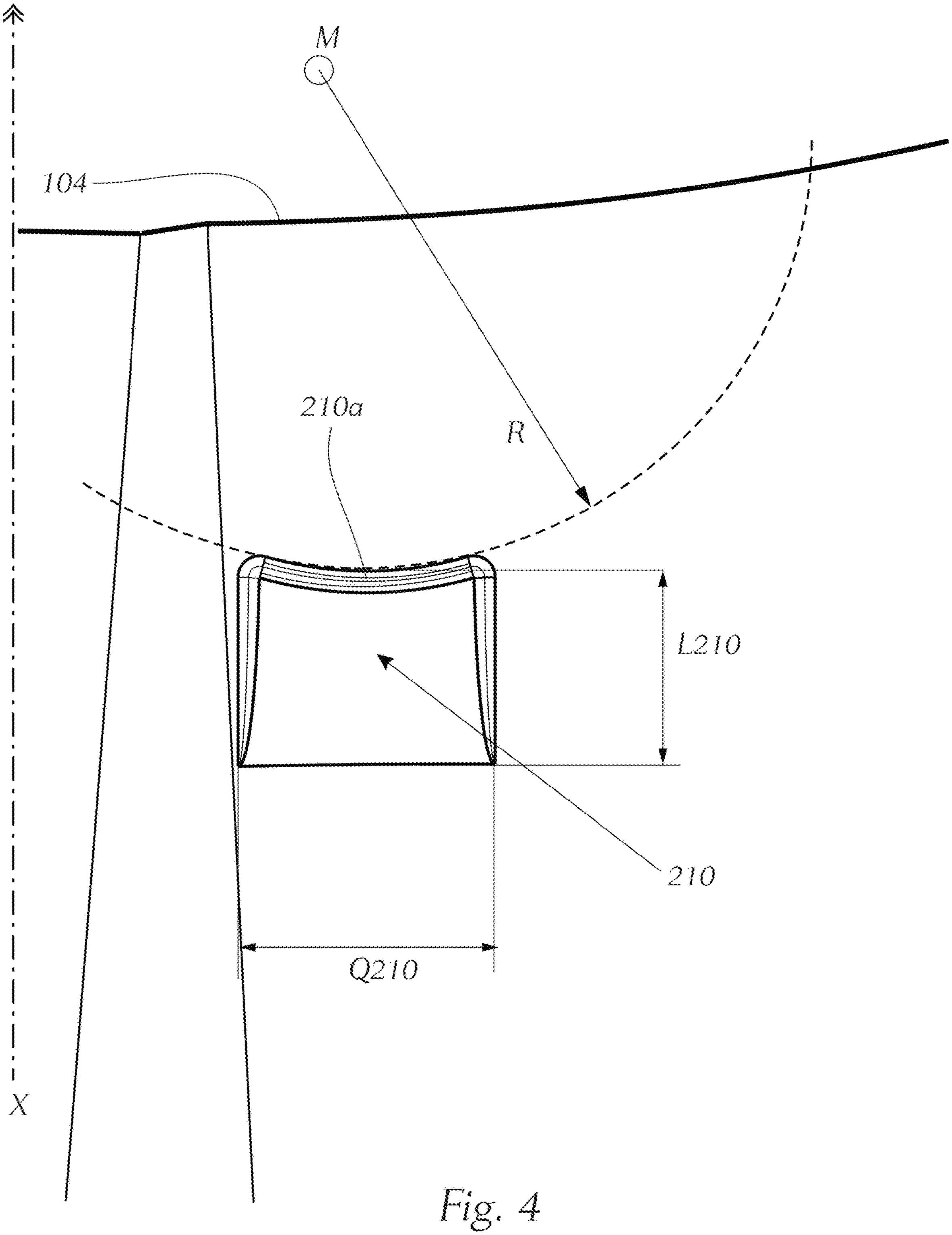
FIG. 4 shows a detail view of the first exit structure shown in FIG. 3 in a top view from below.
Figure 5:
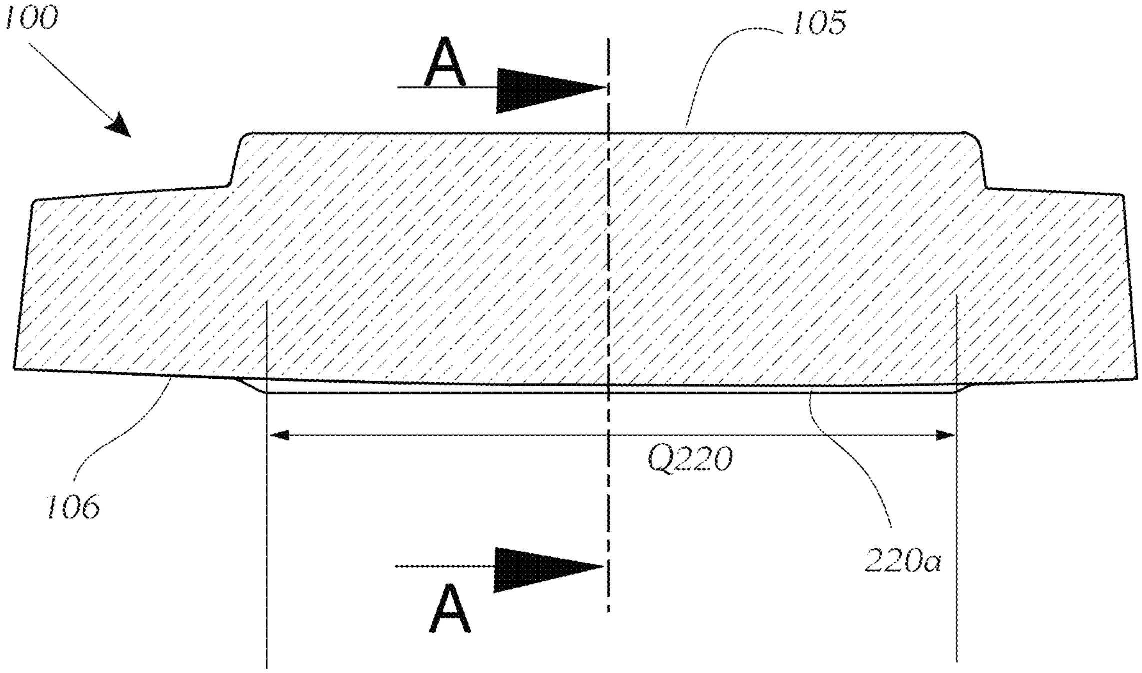
FIG. 5 shows a vertical section normal to the optical axis through the light-permeable body in the region of the second exit structure in a view from the front.
Figure 6:
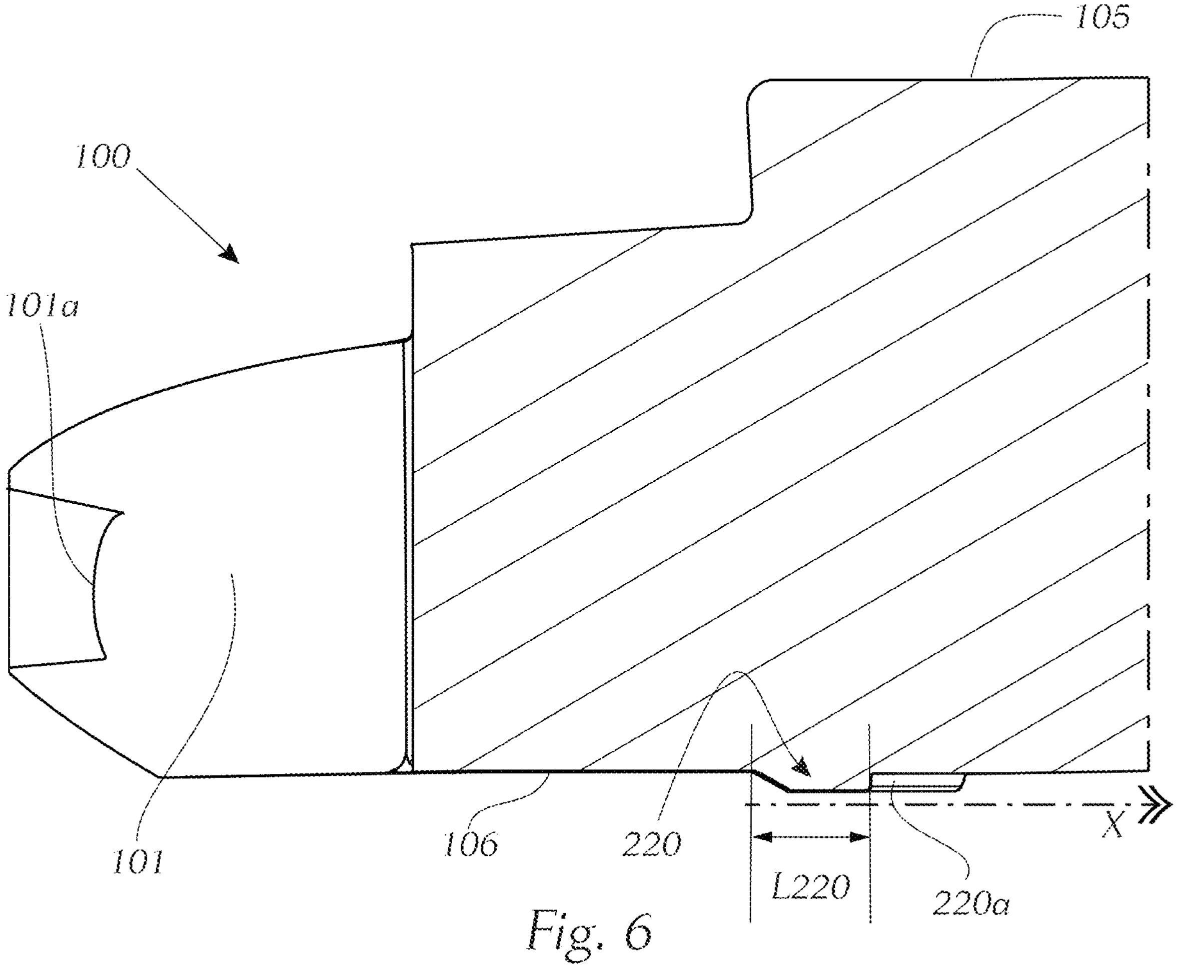
FIG. 6 shows a section along the line A-A shown in FIG. 5.

Departing from the prismatic shape, it is provided that the exit surfaces 210*a*, 220*a* are curved, in particular concavely curved, horizontally, i.e. in horizontal sections, wherein horizontal intersection curves, resulting by intersecting such a curved exit surface 210*a*, 220*a* with horizontal planes, preferably have the shape of a partial circle or follow the shape of the Petzval surface of the projection device. FIG. 4 shows a selected intersection curve in a horizontal sectional plane, wherein the intersection curve constitutes a partial circle with centre point M and radius R. In different horizontal sectional planes, the intersection curves can have identical radii and the centre points lie in a (vertical) line on top of one another; it can, however, also be provided that in different horizontal sectional planes, the radii are different, in particular it can be provided that the radii increase when you move from the outermost horizontal sectional plane in the direction of the body 100. The centre points preferably lie again on a vertical line; the partial circles in different horizontal sectional planes are thus likewise “concentric” partial circles.

It is further preferably provided that the two exit surfaces 210*a*, 220*a* are not curved vertically, i.e. in vertical sections. The intersection curves resulting from intersecting the exit surfaces 210*a*, 220*a* with vertical planes are therefore straight lines.

It is further preferably provided that the exit surfaces 210*a*, 220*a* are inclined to the optical axis X by an angle in such a way that the S3, S4 passing through or exiting run orthogonally to the flat exit surface 210*a*, 220*a*.

Finally, reference is again made to FIG. 7, which shows illuminance measurement points for the regulation of sign light light distributions in accordance with FMVSS108 and the differences to ECE space regulations.

In the diagonally hatched region in which the lines 5-5 and 8-8 are located, there are differences with regard to the required or maximum permitted illuminance of the sign light light distribution; in particular, the illuminance along these two lines must be higher than required by the ECE regulation in the FMVSS108 standard.

FIG. 8 shows, as already described above, an actual light distribution using the exit structures 210, 220 according to the invention. The region B2 is evenly illuminated from left to right via the “rear” exit elements 220. The exit structure 210 mounted on one side on the left illuminates the asymmetrical right-hand region B1 and compensates for the differences between American and European regulations.

The invention claimed is:

1. An illumination device (1) for a motor vehicle headlight for producing light distribution (LV) with a cut-off line (HDG), the illumination device comprising:

at least one light source (10);

a light-permeable body (100);

at least one light injection element (101) for injecting light emitted by the at least one light source (10) into the light-permeable body (100); and a projection device (500), wherein the projection device (500) has a focal surface (P500) and an optical axis (X);

wherein:

light (S10) from the at least one light source (10) enters the light-permeable body (100) via the light injection element (101) and propagates in the light-permeable body (100) as a first light beam (S1) to a light exit surface (102) of the light-permeable body (100), the light-permeable body (100) is delimited by an upper boundary surface (105) and a lower boundary surface (106) opposite the upper boundary surface (105), wherein at least some of the light rays of the first light beam (S1) striking the upper and/or lower boundary surface (105, 106) are totally reflected one or more times at the respective boundary surface (105, 106), the light-permeable body (100) is delimited by a light exit surface (102, 102"), and wherein the light rays that are totally reflected one or more times at the at least one boundary surface (105, 106) and exit the body (100) via the light exit surface (102, 102"), as well as those light rays injected by the light source (10) which propagate without reflection through the light-permeable body (100) to the light exit surface (102, 102") and exit the body (100) via this are modified by the light-guiding body (100) into a second light beam (S2), which is projected by the projection device (500) as the light distribution (LV) to be produced, at least one first optical exit structure (210) and at least one second optical exit structure (220) are provided on or in the lower boundary surface (106), wherein the optical exit structures (210, 220) are designed in such a way that light from the first light beam (S1), which strikes an optical exit structure (210, 220), exits the light-permeable body (100), the light emerging from the at least one first optical exit structure (210) propagates in the form of a third light beam (S3) outside the light-permeable body (100) to the projection device (500), the light emerging from the at least one second optical exit structure (220) propagates in the form of a fourth light beam (S4) outside the light-permeable body (100) to the projection device (500), the at least one second optical exit structure (220) is further away from the focal surface (P500) than the at least one first optical exit structure (210), and the third and fourth light beams (S3, S4) strike the projection device (500) directly, without prior re-entry into the light-permeable body (100), and are projected by this as two sign light light beams (S3', S4') into a region (B) located above the cut-off line (HDG) and together form a sign light light distribution (SV), wherein the two sign light light beams (S3', S4') are projected in different partial regions (B1, B2) of the region (B) located above the cut-off line (HDG).

2. The illumination device according to claim 1, wherein the third and fourth light beams (S3, S4) strike the projection device (500) and pass through it in different regions (P1, P2) of the projection device, (500), in particular below an optical axis (X) of the projection device (500), wherein these regions of the projection device (500) project the third and fourth light beams (S3, S4) as the two sign light light beams (S3', S4') into the region (B) located above the cut-off line (HDG) and form a sign light light distribution (SV), wherein the two sign light light beams (S3', S4') are projected in different partial regions (B1, B2) of the region (B) located above the cut-off line (HDG).

3. The illumination device according to claim 1, wherein the at least one first optical exit structure (210) and the at least one second optical exit structure (220) are designed and arranged in such a way that the third and fourth light beams (S3, S4) strike the projection device (500) or a region (P1, P2) of the projection device (500) in such a way that the partial regions (B1, B2) in which the emerging sign light light beams (S3', S4') are projected by the projection device (500) either partially overlap, or are adjacent to each other in at least one section, or are spaced apart from each other.

4. The illumination device according to claim 1, wherein the at least one first optical exit structure (210) is designed as an elevation on or a depression in the light-permeable body (100), and wherein the at least one second optical exit structure (220) is designed as an elevation on or a depression in the light-permeable body (100).

5. The illumination device according to claim 1, wherein the at least one first and the at least one second optical exit structure (210, 220) respectively extend over a defined transverse extension (Q210, Q220) transverse to the optical axis (X) of the projection device (500), and wherein the at least one first and the at least one second optical exit structure (210, 220) respectively extend over a defined longitudinal extension (L210, L220) approximately in the direction of the optical axis (X) of the projection device (500).

6. The illumination device according to claim 5, wherein the at least one first and the at least one second optical exit structure (210, 220) have a different sized transverse extension (Q210, Q220), wherein the at least one first exit structure (210) which is nearer the light exit surface (102) has a smaller transverse extension (Q210) than the at least one second exit structure (Q220).

7. The illumination device according to claim 5, wherein at least one of the optical exit structures runs symmetrically in relation to the optical axis (X) of the projection device (500) with regard to its transverse extension, wherein a first or second optical exit structure (220) runs symmetrically and the other, second or first optical exit structure (210) asymmetrically in relation to the optical axis (X) of the projection device (500).

8. The illumination device according to claim 5, wherein the transverse direction in which the at least one first and/or the at least one second optical exit structure (210, 220) extend(s), runs substantially normal to the optical axis (X) of the projection device (500) and substantially horizontally.

9. The illumination device according to claim 1, wherein the at least one first and/or the at least one second exit structure (210, 220) is or are designed in the form of an exit prism or has/have exit prisms.

10. The illumination device according to claim 9, wherein each exit prism has an exit surface (210*a*, 220*a*), which is designed and inclined in such a way that the emerging light beams (S3, S4) are directed into the region or regions of the projection device (500) which project the third and fourth light beams (S3, S4) as the two sign light light beams (S3', S4') into the region (B) located above the cut-off line (HDG).

11. The illumination device according to claim 9, wherein at least one exit surface (210*a*, 220*a*) or both exit surfaces (210*a*, 220*a*) is or are concavely curved horizontally, in horizontal sections, wherein horizontal intersection curves, resulting by intersecting such a curved exit surface (210*a*, 220*a*) with horizontal planes have the shape of a partial circle or follow the shape of the Petzval surface (F500) of the projection device (500).

12. The illumination device according to claim 9, wherein the at least one or both exit surfaces (210*a*, 220*a*) are not curved vertically in vertical sections.

13. The illumination device according to claim 9, wherein an exit surface (210*a*, 220*a*) or the exit surfaces (210*a*, 220*a*) are inclined in such a way that the light beams (S3, S4) passing or emerging through the exit surface (210*a*, 220*a*) or through the exit surfaces (210*a*, 220*a*) run orthogonal to the exit surface or the exit surfaces.

14. The illumination device according to claim 1, wherein the light-permeable body (100) has a screen edge (104), which is arranged in the light propagation direction between the light injection element (101) and the projection device (500), wherein the screen edge (104) in the light distribution (LV) is depicted as the cut-off line (HDG).

15. The illumination device according to claim 1, wherein the light injection element (101) forms the light, which is emitted by the light source (10) and enters the light injection element (101), into the first light beam (S1), wherein the light beam (S1) is directed into a defined region (P0) of the screen edge (104).

16. The illumination device according to claim 1, wherein the screen edge (104) is concavely curved in the horizontal direction and follows the focal point line (F500) of the projection device (500) in the screen edge (104), wherein the screen edge (104) lies in the Petzval surface (P500) of the projection device (500).

17. The illumination device according to claim 1, wherein the light exit surface (102") is concave in the horizontal direction and follows the shape of the Petzval surface (P500) of the projection device (500).

18. The illumination device according to claim 1, wherein the light exit surface (102) is convex in the vertical direction.

19. A motor vehicle headlight having at least one illumination device according to claim 1.

* * * * *